(12) United States Patent
Wegkamp

(10) Patent No.: US 7,661,523 B2
(45) Date of Patent: Feb. 16, 2010

(54) LINEAR HYDRAULIC MOTOR AND RECIPROCATING FLOOR CONVEYOR

(76) Inventor: Rene Wegkamp, No. G6 Scintille, North Road, Rivonia, Sandton, 2128 (ZA)

( * ) Notice: Subject to any disclaimer, the term of this patent is extended or adjusted under 35 U.S.C. 154(b) by 115 days.

(21) Appl. No.: 11/666,655

(22) PCT Filed: Oct. 26, 2005

(86) PCT No.: PCT/IB2005/003187

§ 371 (c)(1),
(2), (4) Date: Apr. 1, 2008

(87) PCT Pub. No.: WO2006/048713

PCT Pub. Date: May 11, 2006

(65) Prior Publication Data

US 2008/0257691 A1    Oct. 23, 2008

(30) Foreign Application Priority Data

Nov. 2, 2004    (ZA)    .................... 2004/8853

(51) Int. Cl.
*F15B 15/08*    (2006.01)
(52) U.S. Cl. .................. 198/750.5; 92/88; 198/750.2; 198/750.7
(58) Field of Classification Search ............. 198/750.2, 198/750.5, 750.7; 92/88
See application file for complete search history.

(56) References Cited

U.S. PATENT DOCUMENTS

| | | | | |
|---|---|---|---|---|
| 3,145,588 | A * | 8/1964 | King | 173/152 |
| 4,164,893 | A * | 8/1979 | Granbom et al. | 92/88 |
| 4,969,387 | A | 11/1990 | Foster | |
| 6,007,247 | A * | 12/1999 | Rosengren et al. | 384/41 |
| 6,098,521 | A * | 8/2000 | Iida | 92/88 |
| 6,148,714 | A * | 11/2000 | Abe et al. | 92/88 |
| 6,336,393 | B1 * | 1/2002 | LeMire et al. | 92/88 |
| 6,584,887 | B1 * | 7/2003 | Poeschl | 92/88 |
| 2002/0157922 | A1 | 10/2002 | Kaneko | |

* cited by examiner

*Primary Examiner*—Mark A Deuble
(74) *Attorney, Agent, or Firm*—Millen, White, Zelano & Branigan, P.C.

(57) ABSTRACT

A linear hydraulic motor (12) includes an elongate cylinder (26) and at least one piston (34) slidingly located inside the cylinder. The piston (34) has a longitudinally extending portion which fits with clearance in the cylinder and which describes a path in use which penetrates an interior zone of the cylinder which extends radially inwardly from an aperture in the cylinder wall. An internal reinforcing member (300) is slidingly located inside the cylinder to travel with the piston. The reinforcing member describes a path in use which also penetrates said interior zone of the cylinder which extends radially inwardly from the aperture in the cylinder wall and the reinforcing member has portions which are concentric and radially aligned with circumferentially spaced portions of the cylinder wall that are on opposite sides of said aperture in the cylinder wall.

12 Claims, 7 Drawing Sheets

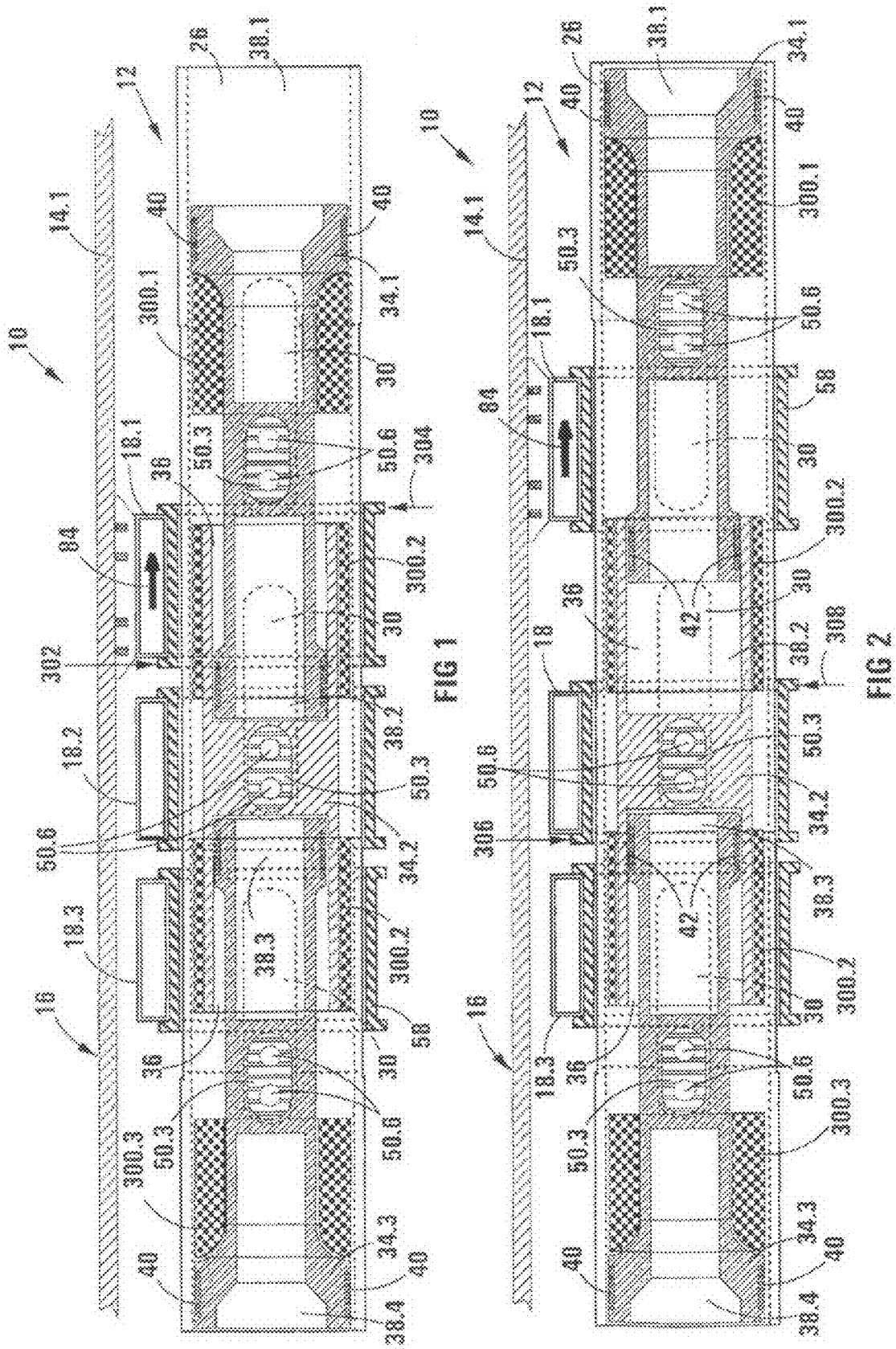

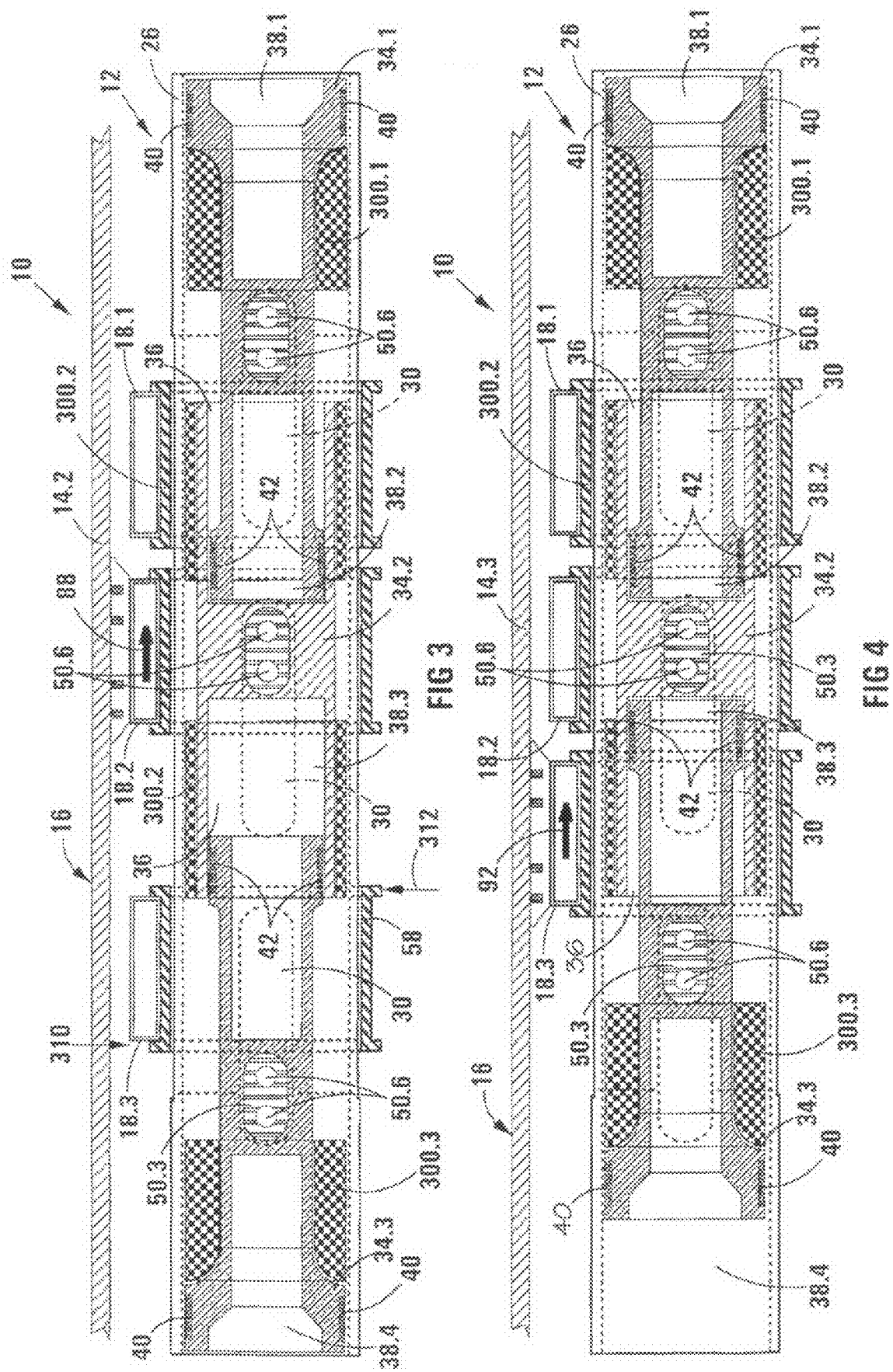

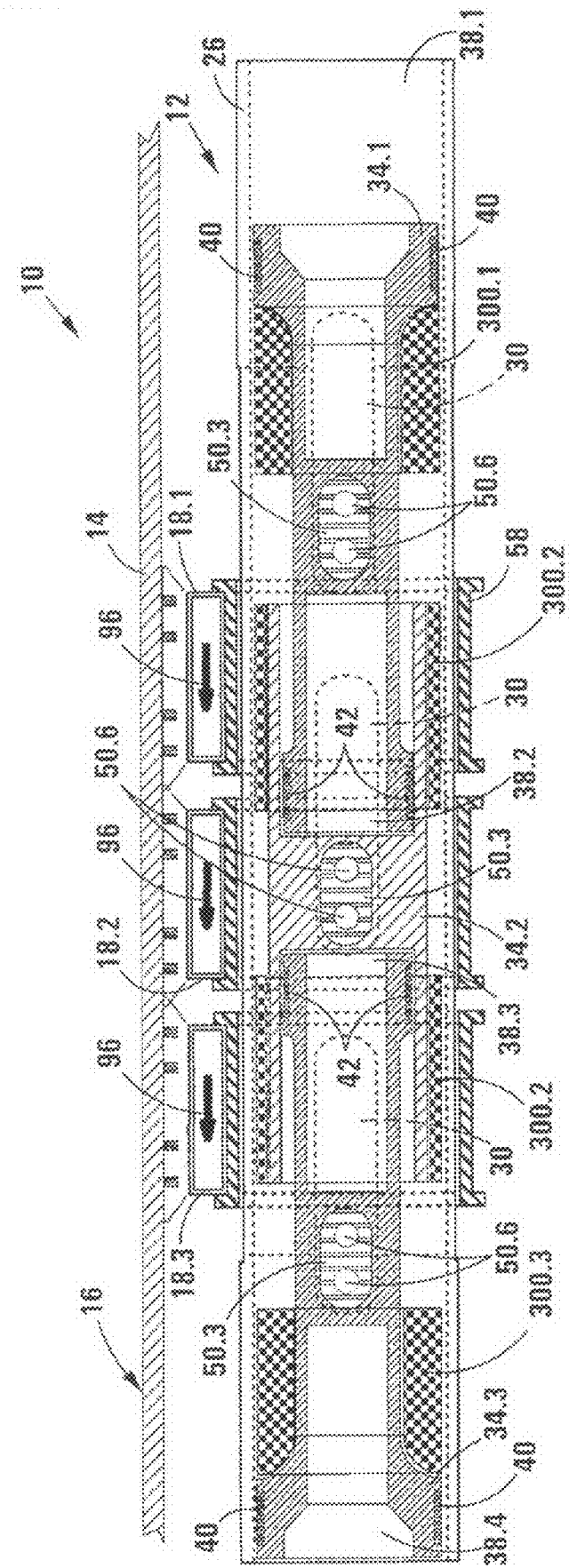

LINEAR HYDRAULIC MOTOR AND RECIPROCATING FLOOR CONVEYOR

THIS INVENTION relates to a linear hydraulic motor and a reciprocating floor conveyor.

According to one aspect of the invention, there is provided a linear hydraulic motor which includes an elongate cylinder with at least one longitudinally extending aperture in a longitudinally extending wall of the cylinder;

at least one piston slidingly located inside the cylinder, the piston having a longitudinally extending portion which fits with clearance in the cylinder and which describes a path in use which penetrates an interior zone of the cylinder which extends radially inwardly from the aperture in the cylinder wall;

an internal reinforcing member slidingly located inside the cylinder to travel with the piston and located over at least a portion of said longitudinally extending portion of the piston, the reinforcing member describing a path in use which also penetrates said interior zone of the cylinder which extends radially inwardly from the aperture in the cylinder wall and the reinforcing member having portions which are concentric and radially aligned with circumferentially spaced portions of the cylinder wall that are on opposite sides of said aperture in the cylinder wall; and at least one force transfer member connected to the piston through said aperture in the cylinder wall.

By "longitudinally extending aperture" is meant an aperture which extends in a direction which has at least a directional component which is longitudinal with respect to the cylinder. Preferably, the aperture has a longitudinal axis which is parallel to the longitudinal axis of the cylinder.

The reinforcing member may at least partially close the aperture in the cylinder wall when sliding past the aperture. Thus, the reinforcing member may have a portion which is concentric and radially aligned with the aperture, when sliding past the aperture. Typically, the cylinder is circular cylindrical, the reinforcing member being at least part circular cylindrical with a chord which is at least equal but preferably longer than a chord of the aperture in the cylinder wall. In other words, when seen in section transverse to the cylinder, the reinforcing member typically has an arc length which is greater, preferably substantially greater, than an arc length of the aperture in the cylinder wall. The reinforcing member, when seen in section transverse to the cylinder, may thus have an arc length subtended by an angle of at least 45°, preferably at least 60°, more preferably at least 75°, most preferably at least 85°, e.g. about 90°. Typically, the aperture, when seen in section transverse to the cylinder, has an arc length subtended by an angle of about 42° or less.

In one embodiment of the invention, the reinforcing member is in the form of a circular cylindrical sleeve. The sleeve may be longitudinally split in at least one location.

In another embodiment of the invention, the reinforcing member is in the form of a half pipe.

The reinforcing member may be of a synthetic plastics or polymeric material. Advantageously, when of a synthetic plastics or polymeric material, a weight saving can be achieved for the linear hydraulic motor of the invention. Examples of suitable synthetic plastics or polymeric materials are Vesconite (trade name) and Teflon (trade name).

Instead, the reinforcing member may be of a metal, such as brass. Typically, when of a metal, the metal has a lower density than the material of construction of the piston.

The reinforcing member may fit with slight clearance, e.g. about 0.25 mm clearance, inside the cylinder. Advantageously, this reduces slide resistance. However, when a bending moment of a predetermined magnitude is applied to the cylinder in a direction perpendicular to a centrally disposed axis through the aperture in the cylinder wall (i.e. a bending moment which has the tendency to collapse the aperture in the cylinder wall), the reinforcing member should be in contact with said circumferentially spaced portions of the cylinder wall, on opposite sides of the aperture in the cylinder wall. In this way, the reinforcing member bridges the aperture in the cylinder wall and transfers at least part of the load or stress from one area of the cylinder wall to another, circumferentially spaced area of the cylinder wall, reducing the tendency of the applied bending moment to collapse the aperture in the cylinder wall, which is between said circumferentially spaced areas of the cylinder wall.

Typically, for each force transfer member, there is a longitudinally extending aperture. The apertures may be oblong and may form discrete openings in the wall of the cylinder. Preferably, a reinforcing member, or part of a reinforcing member, is associated with each aperture.

Although the Applicant expects that there may be many applications for the linear hydraulic motor of the invention, it is expected that the linear hydraulic motor will be particularly suitable for use in reciprocating floor conveyors.

The aperture is typically spaced from ends of the cylinder. In other words, the aperture has ends that are longitudinally spaced from the ends of the cylinder. The cylinder may have end portions which are free of discontinuities that extend longitudinally between the aperture and the ends of the cylinder, advantageously allowing the cylinder to operate with a hydraulic fluid under substantial pressure without the pressure deforming the cylinder.

Typically, the cylinder has at least two longitudinally extending, longitudinally spaced apertures and an intermediate portion between adjacent apertures, the intermediate portion being free of discontinuities extending longitudinally between the apertures. Preferably, the at least two apertures are aligned with one another, thus having centres that are spaced in a longitudinal direction, with adjacent ends of the apertures being spaced and being on the same longitudinal axis which is parallel to a central longitudinal axis of the cylinder.

The linear hydraulic motor may include at least two, e.g. up to four, longitudinally spaced pistons inside the cylinder. Typically, the pistons are arranged in series. It is to be appreciated however that the number of pistons will typically be dictated by practical considerations and the application in which the linear hydraulic motor is to be used, and that there is no theoretical reason why more than four pistons cannot be included. For application in reciprocating floor conveyors, it is expected that mostly three, and sometimes two, pistons will be included.

Preferably, the pistons are movable independently from each other in at least one longitudinal direction inside the cylinder. Preferably, the pistons are movable in unison in a counter-direction, thereby providing the linear hydraulic motor with a stroke in which the pistons can be simultaneously displaced in one direction.

The cylinder typically includes an elongate body, which is preferably seamless. If desired, at least one end of the body may be domed.

A removable cap may be located at least one end of the elongate body. In one embodiment, the cap is screwed onto the elongate body. In another embodiment of the invention, the cap is clamped or bolted to the elongate body. In fact, the Applicant expects that in a preferred embodiment there will be two end caps, both end caps being bolted to the elongate body.

The cap or caps may be domed, if desired. The cap or caps may fit slidingly into the cylinder with end heads abutting against ends of the cylinder.

An interior zone of the cylinder, with a length at least equal to the length of the aperture and into which the aperture opens, is typically unpressurised by a hydraulic fluid during any stroke of the piston. In other words, the cylinder defines a hollow interior within which the piston can slide, a portion of the hollow interior, corresponding with the location of the aperture, not being filled with a working hydraulic fluid during a stroke, in any longitudinal direction, of the piston. Typically, said portion of the hollow interior is annular when seen in section transverse to the cylinder. Advantageously, it is thus not necessary to provide for hydraulic fluid sealing around the periphery of the aperture.

One or more of the pistons may include one or more hollow portions. Advantageously, this reduces the mass of the linear hydraulic motor. Also, in some embodiments of the invention, opposed end surfaces of at least some of the pistons are substantially equal in area to the cross-sectional internal area of the cylinder, advantageously increasing the contact area with hydraulic fluid.

When the linear hydraulic motor includes two or more pistons, at least one of the pistons may define a bore for receiving an end portion of an adjacent piston, the bore and adjacent piston defining between them a chamber for receiving hydraulic fluid. Thus, in use, when a hydraulic fluid is forced into the chamber defined by the bore and the adjacent piston, the piston with the bore and the adjacent piston are forced apart, with typically one of the pistons being displaced.

The piston defining a bore may have an associated force transfer member. The end portion of the adjacent piston may describe a path in use which penetrates an interior zone of the cylinder which extends radially inwardly from the aperture in the cylinder wall for the force transfer member of the piston defining a bore. Advantageously, in this way the overall length of the cylinder can be limited and this can be achieved without providing sealing between the end portion of the adjacent piston, on the one hand, and the cylinder and the aperture on the other hand.

Typically, the piston or pistons and the cylinder define a plurality of chambers for receiving hydraulic fluid, the number of chambers being equal to the number of pistons plus one.

The linear hydraulic motor may include one or more stops to prevent one of the pistons from being displaced when a hydraulic fluid is forced into a chamber between two pistons. Said stop or stops may be defined by an end cap.

Advantageously, when the linear hydraulic motor includes a chamber defined between the bore of one piston and an end portion of an adjacent piston received inside the bore, a reduced number of critical hydraulic fluid seals are required between the pistons and the cylinder than when the chambers are not defined inside the bore of a piston. Thus, in one embodiment of the invention, the number of critical hydraulic fluid seals equals the number of pistons plus one. Further advantages of this arrangement include that the length of the cylinder and the weight of the motor are reduced.

The linear hydraulic motor typically includes, for each piston, at least one force transfer member associated with and connected transversely outwardly through an aperture in the wall of the cylinder to the piston, to replace conventional piston rods. The force transfer member may be secured in a keyway in a side of its associated piston. Instead, or in addition, the force transfer member and its associated piston may have textured, e.g. corrugated surfaces where they contact each other.

Preferably, each force transfer member includes a portion which projects radially away from its associated piston.

Preferably, each piston is associated with at least a pair of force transfer members. In case of a pair of force transfer members, the force transfer members are preferably diagonally opposed to each other and each preferably includes a portion which projects radially away from its associated piston. When a piston is associated with more than two force transfer members, e.g. three, the force transfer members are preferably equiangularly spaced about the piston.

Each force transfer member may be removably connected to its associated piston. In one embodiment of the invention, the force transfer members are each bolted to their associated pistons by means of radially extending bolts.

At least some of the force transfer members may each define a passage for hydraulic fluid. Typically, when present, the passage is aligned with a hydraulic fluid passage defined by the associated piston and leading into one of the chambers. The hydraulic fluid passages defined by the force transfer members may be connected or connectable to a hydraulic fluid source by means of flexible conduits.

Instead, or in addition, the linear hydraulic motor may include one or more longitudinally extending passages, some of which may extend through one or more of the pistons, for hydraulic fluid. In this case, the passage or passages typically extend through one or both ends of the cylinder. Such a passage may be defined by a conduit, which may thus pass through one of the pistons. Where the conduit passes through a piston, a hydraulic fluid seal may be provided. In this case, hydraulic fluid conduits for supplying and removing hydraulic fluid to the motor may be rigid.

The linear hydraulic motor may thus be a motor which includes two or more pistons and at least two chambers defined inside the cylinder, the motor having a stroke characterised in that, when a hydraulic fluid is forced into only one chamber, all of the pistons are simultaneously displaced in a common direction. The motor may also include a chamber defined between adjacent pistons and it may thus have a stroke characterised in that, when a hydraulic fluid is forced into said chamber, only one of the adjacent pistons is displaced. The other piston may be prevented from moving as a result of the presence of the stop, as hereinbefore described, or as a result of the presence of another piston which is not at that stage free to move.

Each longitudinally extending aperture or slot may have a longitudinally extending length of at least 100 mm, preferably between about 150 mm and about 500 mm, e.g. about 300 mm. This length is thus typically about equal to the length of a stroke of the piston associated with the aperture, plus the width of the portion of the force transfer member which projects through the aperture.

At least a portion of an exterior surface of the wall of the cylinder may be treated in order to provide a bearing surface for supporting a sliding load on the cylinder. In one embodiment of the invention, the bearing surface may be provided by a chromed or nickel coated exterior surface portion of the wall of the cylinder. Instead, the exterior surface of the wall of the cylinder may be merely polished, with the cylinder being of a high chrome steel, i.e. a steel with more than 10.5% chrome by weight. The steel may comply with Euronorm Standards EN 10088 or EN 10028, and may be 3CR12 steel. In another embodiment of the invention, the bearing surface is provided by a sleeve, which may be of a synthetic plastics or polymeric material such as Vesconite (trade mark) or nylon, or another suitable material with a low coefficient of kinetic friction such as brass.

In yet another embodiment, the cylinder and/or the pistons may be of aluminium or an aluminium alloy.

The linear hydraulic motor may include an external cover or covers associated with one or more of the apertures. In one embodiment of the invention, a concertina-like sleeve is provided over the cylinder for each pair of opposed apertures. In another embodiment, a tubular sleeve over the cylinder is provided for each piston, the sleeve moving in unison with the piston. However, as will be appreciated, as a result of the presence of the reinforcing members, when configured also to act as closure members for the longitudinally extending apertures in the cylinder wall thereby inhibiting ingress of dirt or other unwanted matter, the external covers may be superfluous.

According to another aspect of the invention, there is provided a reciprocating floor conveyor which includes a plurality of elongate floor members defining a floor surface and being grouped in at least two sets;

at least two transverse drive beams, each drive beam being fast with an associated set of the floor members; and drive means drivingly connected to the transverse drive beams, the drive means including at least one linear hydraulic motor as hereinbefore described drivingly connected to at least one of the transverse drive beams, said transverse drive beam being slidingly supported on the cylinder of the linear hydraulic motor.

The drive means is thus configured to drive the elongate floor members in one direction, for advancing a load supported on the floor, and for retracting them in the opposite direction.

Preferably, the linear hydraulic motor includes two or three longitudinally spaced pistons, each piston in use transferring force transversely outwardly through the cylinder to an associated transverse drive beam. Typically, each piston is associated with a pair of force transfer members, the force transfer members being diagonally opposed to each other. Each force transfer member may include a portion which projects radially, preferably horizontally away from the other, with the cylinder or cylinders being horizontally arranged, although portions projecting in other directions, e.g. vertically, are naturally not excluded from the scope of the invention.

In a preferred embodiment, each of the transverse drive beams is supported slidingly by the cylinder, which in the preferred embodiment is a common cylinder for all the transverse drive beams.

At least 90%, preferably at least 95% of the weight of each transverse drive beam may be supported by the cylinder on which the transverse drive beam rests. In one embodiment of the invention, the entire weight of at least one of the transverse drive beams is supported by the cylinder on which it rests.

The cylinder may have an outer diameter of at least 100 mm, preferably at least 150 mm, e.g. about 175 mm.

Each transverse drive beam may be arranged relative to the cylinder such that the shortest radially measured distance between an outer surface of the cylinder and the floor surface is less than 120 mm, preferably less than 100 mm, e.g. about 85 mm. Advantageously, this reduces the moment about a transverse axis extending through the connection between a piston and a force transfer member, caused by inertia and/or frictional forces when a transverse drive beam is slidingly linearly displaced. A portion of the cylinder may be received inside a recess provided underneath the transverse drive beam supported by the cylinder. Instead, the transverse drive beam may be elevated entirely above the upper outer surface of the cylinder.

At least one of the transverse drive beams may support at least some of the elongate floor members not forming part of the associated set of elongate floor members fast with said at least one transverse drive beam. Said at least one transverse drive beam may thus include guide formations guiding and supporting the elongate floor members not fast with said at least one transverse drive beam.

At least one of the transverse drive beams may taper outwardly towards free ends thereof, thus having an operative vertical dimension decreasing from immediately adjacent the cylinder supporting it towards its free ends. Similarly, in plan view, at least one of the transverse drive beams may taper outwardly from its middle towards its opposed free ends.

The cylinder of the at least one linear hydraulic motor may be fastened to two or more transverse beams or chassis members forming part of or fast with a chassis of a vehicle or other structure. A portion of the cylinder may be received in a recess provided in the bottom of each transverse beam.

At least one cradle associated with and fastened to one of the transverse beams may support the cylinder.

At least one of the transverse beams may be a composite beam, comprising a central length portion of higher mass per unit length, and two end portions of lower mass per unit length, end regions of the central length portion being supported by longitudinally extending members of the chassis.

The invention will now be described, by way of example only, with reference to the accompanying diagrammatic drawings in which FIGS. 1 to 5 show a vertical, longitudinal section through a portion of a reciprocating floor conveyor in accordance with the invention, and which includes a linear hydraulic motor in accordance with the invention;

Figure 6:
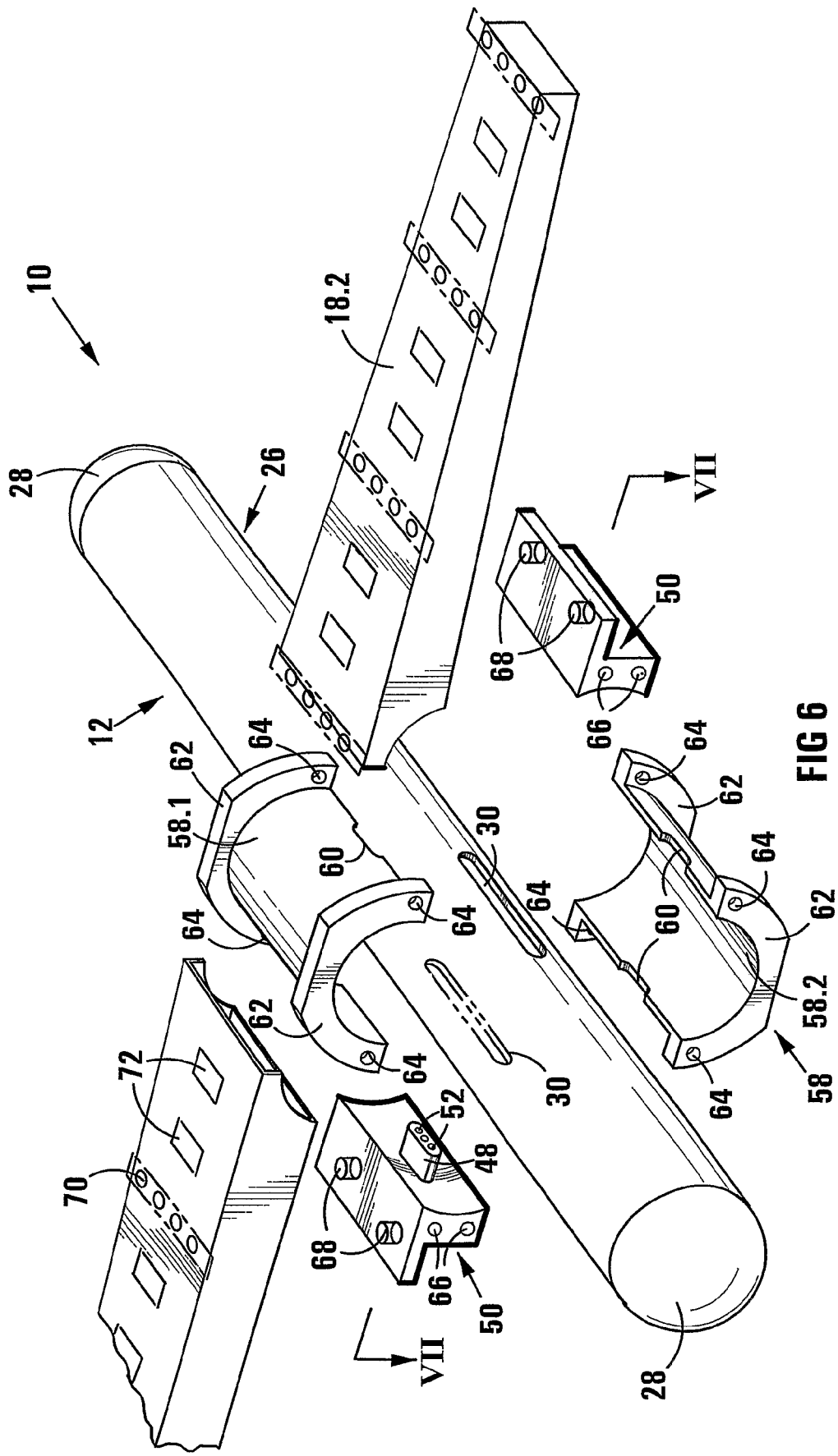
FIG. 6 shows an exploded three-dimensional view of some components only of the linear hydraulic motor of FIGS. 1 to 5, and one transverse drive beam of the reciprocating floor conveyor of FIGS. 1 to 5.

Referring to the drawings, reference numeral 10 generally indicates a reciprocating floor conveyor in accordance with the invention, which includes a linear hydraulic motor in accordance with the invention, generally designated by reference numeral 12.

Figure 9:
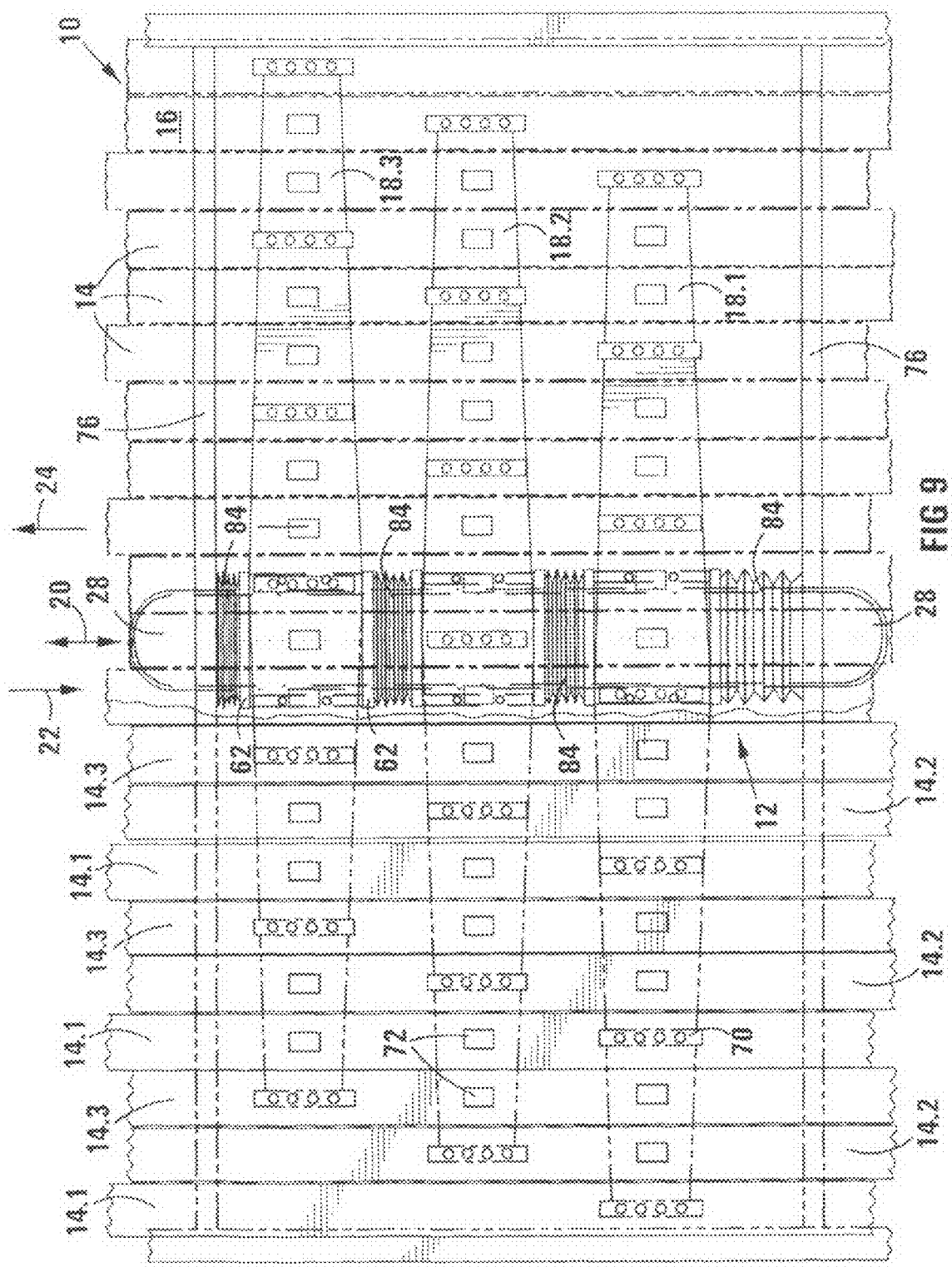
FIG. 9 shows a plan view of a portion of the reciprocating floor conveyor of FIGS. 1 to 5.

The reciprocating floor conveyor 10 comprises a plurality of elongate floor members or slats 14 arranged side by side to define a floor surface 16 (see FIG. 9). The slats 14 are grouped together in three groups 14.1, 14.2 and 14.3. Thus, when starting from the left in FIG. 9, the first slat, and every third slat thereafter, belongs to the group 14.1. The second slat, and every third slat thereafter, belongs to the group 14.2 and the third slat, and every third slat thereafter, belongs to the group 14.3.

The slats of the group 14.1 are attached to a transverse drive beam 18.1, the slats of the group 14.2 are attached to a transverse drive beam 18.2 and the slats of the group 14.3 are attached to a transverse drive beam 18.3.

By means of the linear hydraulic motor 12, the transverse drive beams 18.1, 18.2 and 18.3, and thus the groups of slats 14.1, 14.2, 14.3 are reciprocatingly moved backwards and forwards in a particular sequence, in the direction of the double-headed arrow 20 shown in FIG. 9. The operation of a reciprocating floor conveyor is well-known to those skilled in the art, and only a very brief description of the sequence of the displacement of the groups of slats 14.1, 14.2, 14.3 will be given.

In order to displace a load, such as a load of wood chips supported on the floor surface 16, the group of slats 14.1 is displaced longitudinally by means of the transverse drive beam 18.1 in, say, the direction of arrow 22 shown in FIG. 9. Thereafter, the group of slats 14.2 is displaced by means of the transverse drive beam 18.2 in the direction of the arrow 22, followed by the displacement of the group of slats 14.3 by means of the transverse drive beam 18.3, in the direction of the arrow 22. As will be appreciated, with one third of the slats 14 only being displaced each time, the load supported on the floor surface 16 remains stationary. Once all three groups 14.1, 14.2 and 14.3 have been displaced in the direction of arrow 22, all three groups 14.1, 14.2 and 14.3 are simultaneously displaced in the direction of the arrow 24, thus moving the entire load supported on the floor surface 16 in the direction of the arrow 24. This process is then repeated in order to move the load stepwise in the direction of the arrow 24 over the surface 16.

The linear hydraulic motor 12 will now be described in more detail. The motor 12 comprises an elongate circular cylindrical cylinder 26. Ends of the cylinder 26 are closed by means of domed end caps 28. The end caps 28 are not shown in FIGS. 1 to 5 but can be clearly seen in FIG. 6 and in FIG. 9. Typically, at least one of the end caps 28 is removable, and may thus be screwed or bolted to the cylinder 26. No particular fastening mechanism is shown in the drawings. However, it should be noted that, in a preferred embodiment of the invention, the end caps are not domed but each end cap rather comprises a disc-shaped end head with an integral spigot portion which can slide into the cylinder 26 with the end head abutting against a flange (not shown) provided at an open end of the cylinder 26. Threaded bolts then screw into threaded bolt holes in the flange to mount the end cap to the cylinder 26. An O-ring seal can be provided on the spigot portion to ensure adequate sealing between the spigot portion and the cylinder 26. With this arrangement, hydraulic fluid ports can simply extend through the end cap. If it is required that any of the hydraulic fluid ports must have a tube which extends into the cylinder 26, the tube can be simply bolted to the end spigot portion of the end cap. Such an arrangement is described in WO 2004/067967.

Six longitudinally extending apertures or slots 30 are provided in the cylinder 26. The slots 30 are arranged in three longitudinally spaced groups of two each, with the two slots 30 of each group being located on diagonally opposed sides of the cylinder 26, facing sideways in a horizontal direction. In the embodiment of the linear hydraulic motor 12 shown in the drawings, the cylinder 26 has an internal diameter of about 145 mm, a length of about 1600 mm and slots 30 with a length of about 300 mm each.

Figure 7:
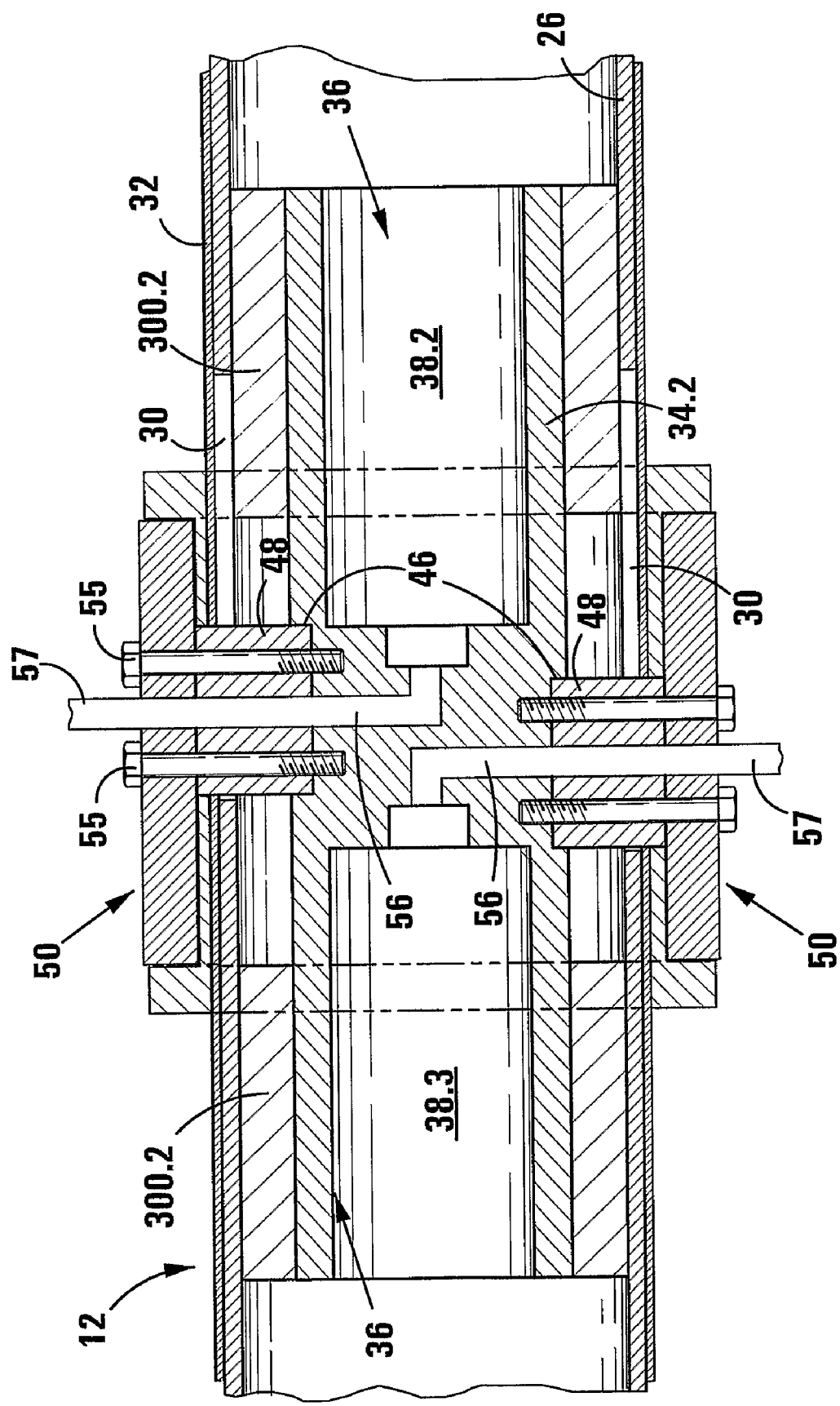
FIG. 7 shows a longitudinal horizontal section taken at VII-VII in FIG. 6 of the drawings.

A sleeve 32 of a friction reducing material, such as vesconite (trade mark), nylon or brass, is fitted over the cylinder 26. The slots 30 extend also through the sleeve 32. The sleeve 32 is shown in FIG. 7 only.

Three pistons 34.1, 34.2 and 34.3 are axially, reciprocatingly slidingly, located inside the cylinder 26. End portions of each piston 34.1, 34.2, 34.3 are hollow, thus advantageously reducing the weight of the pistons. Furthermore, the opposed hollow end portions of the piston 34.2 each define a bore 36 within which end portions of the piston 34.1 and 34.3 are received in a sealing and sliding manner. The end portions of the piston 34.1 and 34.3 are thus guided in the bores 36. As will thus be noted, between the cylinder 26 and the pistons 34.1, 34.2 and 34.3, four varying capacity chambers 38.1, 38.2, 38.3 and 38.4 for receiving and expelling hydraulic fluid are defined. These chambers can be clearly seen in FIGS. 1 to 5 of the drawings.

Annular critical hydraulic fluid seals 40 seal the pistons 34.1 and 34.3 against an interior surface of the cylinder 26. Similarly, annular hydraulic fluid seals 42 seal the pistons 34.1 and 34.3 against interior surfaces of the bores 36 defined by the piston 34.2 (see FIG. 2). If desired, annular bands of friction reducing material, such as vesconite (trade mark), nylon or brass which can act as bearing surfaces for the piston 34.2, may be provided in order to facilitate axial displacement of the piston 34.2 inside the cylinder 26. However, in FIGS. 1 to 5, such annular bands are not shown.

In one embodiment of the invention, associated with each slot 30, each piston 34.1, 34.2, 34.3 defines a keyway 46 (see FIG. 7 of the drawings) within which a radially horizontally extending mounting block 48 of a force transfer member 50 (see FIGS. 6 and 7) is secured. Each mounting block 48 thus extends through the slot 30 in use to transfer force from the pistons 34.1, 34.2, 34.3 to which it is secured, sideways through the cylinder 26 to an associated one of the transverse drive beams 18.1, 18.2, 18.3. In this embodiment, a pair of passages 52 is provided in each mounting block 48 (see FIG. 6) and a pair of threaded passages 50.6 (see FIGS. 1 to 5) is provided on diagonally opposed sides of each piston 34.1, 34.2, and 34.3. Bolts 55 (see FIG. 7) are used to bolt each mounting block 48 and thus each force transfer member 50, to its associated piston 34.1, 34.2, 34.3 as shown in FIG. 7 of the drawings. Also in this embodiment, one of the mounting blocks 48 secured to the piston 34.1 and one of the mounting blocks 48 secured to the piston 34.3 each defines a hydraulic fluid passage (not shown) which is aligned with a hydraulic fluid passage 54 defined respectively by the pistons 34.1 and 34.3 and which respectively leads into the chambers 38.1 and 38.4. Similarly, both of the mounting blocks 48 secured to the piston 34.2, in this embodiment, define a hydraulic fluid passage 57 aligned with a hydraulic fluid passage 56 defined by the piston 34.2 and respectively leading into the chambers 38.2 and 38.3. Although not shown in the drawings, a sealing arrangement such as an O-ring or the like, is typically used to ensure that the passages 57 connect in a leak-free manner with the passages 56.

Figure 8:
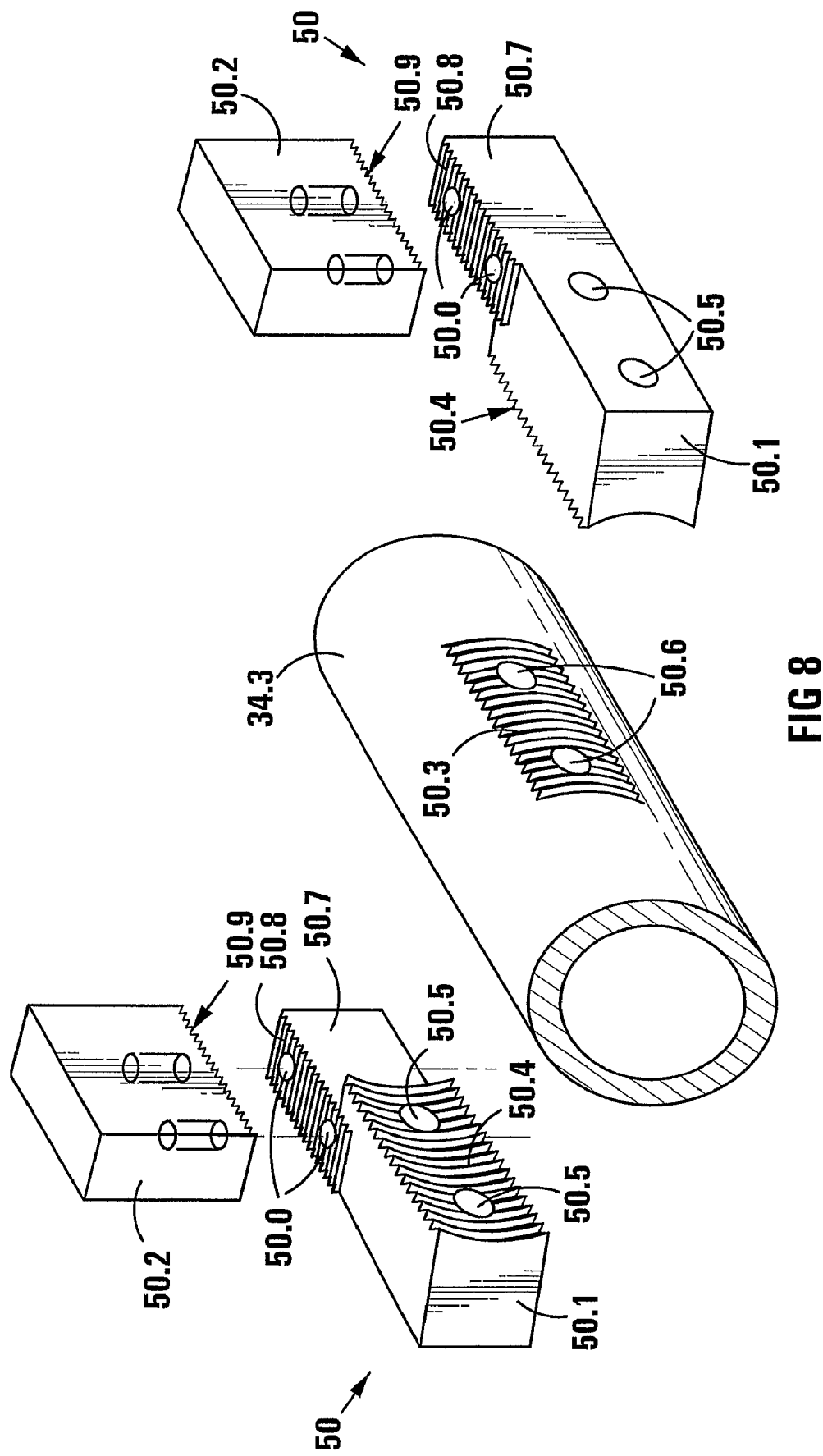
FIG. 8 shows an exploded three-dimensional view of some components only of a further embodiment of a linear hydraulic motor in accordance with the invention.

An alternative configuration for the force transfer members 50 is shown in FIG. 8 of the drawings. FIG. 8 shows some components only of a further embodiment of a linear hydraulic motor in accordance with the invention, using the same reference numerals where possible for the same parts or features as are used in relation to the motor 12. The piston 34.3 is shown schematically only. The force transfer members 50 each comprise a radially extending portion 50.1 and a vertically extending portion 50.2. Diagonally opposed curved external surface areas 50.3 of the piston 34.3 are corrugated (only one of the areas 50.3 is visible in FIG. 8). Areas 50.4 of the portions 50.1 facing the areas 50.3 are complementary curved and complementary corrugated. The corrugations of the areas 50.3 and 50.4 thus provide an interlocking feature to inhibit relative longitudinal displacement of the piston 34.3 and the force transfer members 50. Bolt holes 50.5 are provided in the portions 50.1 and complementary threaded holes 50.6 are provided in the piston 34.3 to allow the portions 50.1 to be bolted to the piston 34.3. The bolt holes 50.6 and the corrugated areas 50.3 are shown in FIGS. 1 to 5.

The portions 50.1 are extended longitudinally in one direction only, defining base portions 50.7 with corrugated upper surface areas 50.8. Lower surfaces 50.9 of the portions 50.2 are corrugated complementary to the surfaces 50.8 and bolt holes 50.0 extend through the portions 50.7 and into the portions 50.2 where they are threaded, allowing the portions 50.2 to be bolted from beneath to the portions 50.7. Upper surfaces of the portions 50.2 are then welded or bolted to an associated transverse drive beam, in this case the transverse drive beam 18.3.

In a similar embodiment (not shown), the transverse drive beam is bolted to end surfaces of the portions 50.2. In other words, in this embodiment, the bolts extend through the portions 50.2 in a direction parallel to the cylinder (i.e. typically horizontally), instead of typically vertically. In this embodiment, the portions 50.1 are not extended longitudinally. As will be appreciated, as the portions 50.2 in effect bolt against sides of the transverse drive beam, and not from underneath the transverse drive beam, there is no need for the portions 50.1 to be extended in a longitudinal direction. In order to save weight, the portions 50.2 may be triangular. In fact, in this embodiment, the force transfer members 50 may be of unitary construction.

With the configuration shown in FIG. 8 of the drawings and the alternative configuration described above, the two outer transverse drive beams 18.3 and 18.1 can be brought closer to the centre transverse drive beam 18.2, allowing the linear hydraulic motor to be suspended from transverse beams 76 of a vehicle chassis which are relatively close together (see FIG. 9). This advantageously reduces the span between the transverse chassis beams 76, in turn reducing the deflection in the cylinder 26 when the reciprocating floor conveyor is carrying a load and advantageously provides more support to the slats 14.

Referring now again to the reciprocating floor conveyor 10 with the force transfer members 50 of the configuration shown in FIG. 6 (in which many components and features have been omitted for clarity and in which only one pair of slots 30 is shown), each pair of slots 30 is associated with a split collar 58 comprising an upper half 58.1 and a lower half 58.2. The upper and lower halves 58.1, 58.2 of the collars 58 encircle the cylinder 26. Along longitudinally extending edges of the halves 58.1, 58.2 where they meet, recesses 60 are provided to define apertures through which the mounting blocks 48 can extend. Thus, when assembled, the collar 58 can be slidingly displaced along the length of the cylinder 26 in the directions of the double-headed arrow 20 as shown in FIG. 9 of the drawings, with the mounting blocks 48 extending through the slots 30 and limiting the longitudinal travel of the collar 58 to the length of the slots 30 minus the width of the mounting block 48, i.e. about 200 mm. Instead of the sleeve 32 fitted over the cylinder 26, a short sleeve or lining may be attached to the collar 58 to slide with the collar 58 over the cylinder 26.

Each collar half 58.1, 58.2 includes a semi-circular flattened flange 62 defining two apertures 64. When assembled, the apertures 64 are aligned with threaded passages 66 in the force transfer members 50 shown in FIG. 6. The apertures 64 and the threaded passages 66 are thus used to bolt the force transfer members 50 to the upper and lower halves 58.1, 58.2 of the collar 58, thereby also to bolt the upper and lower halves 58.1, 58.2 together. As mentioned hereinbefore, for the transverse drive beams 18.1 and 18.3, it is preferred that the force transfer members bolt onto their sides and not from below. The collar halves 58.1 and 58.2 for the transverse drive beams 18.1 and 18.3 thus do not have to make provision for the force transfer member to bolt thereto and the collar halves 58.1, 58.2 can be bolted to one another directly. Between adjacent collars 58, and between the outermost collars 58 and the transverse chassis beams 76, concertina-like rubber sleeves 84 may be provided, if desired, to ensure that the slots 30 are always protected against ingress of dirt or the like.

Each of the transverse drive beams 18.1, 18.2, 18.3 is supported by an associated one of the upper collar halves 58.1. As can be clearly seen in FIG. 6 of the drawings, in the embodiment shown, a recess is provided in a lower surface of each transverse drive beam 18.1, 18.2, 18.3 within which the upper collar half 58.1 is received. Two apertures 68 are provided in the force transfer members 50 for the transverse drive beam 18.2, through which bolts can be inserted to bolt the force transfer members 50 to the transverse drive beam 18.1, from below. When a piston, such as the piston 30.2 is displaced axially inside the cylinder 26, its associated transverse drive beam 18.2 moves in unison with the piston 13.2.

The slats 14 of a group of slats 14.1, 14.2, 14.3 are secured to an associated transverse drive beam 18.1, 18.2, 18.3 by means of mounting formations 70 (see FIGS. 6 and 9). Where the slats 14 of one of the groups pass over the transverse drive beams to which the slats 14 of another group are secured, a guide block 72 is provided to support and guide each slat 14. Such mounting formations 70 and guide blocks 72 are known to those skilled in the art, are not described in any more detail, and the guide blocks 72 are entirely optional.

As can be clearly seen in FIG. 6 of the drawings, each transverse drive beam 18.1, 18.2, 18.3 becomes thinner, in a vertical direction, away from the cylinder 26. Similarly, as shown in FIG. 9 of the drawings, each transverse drive beam 18.1, 18.2, 18.3 tapers in plan view towards its free ends, away from the cylinder 26. The drive beams 18.1, 18.2, 18.3 thus taper in a lateral direction starting from a widest portion near or at their points or attachments to the cylinder 26, the widest portion of the drive beam 18.2 being midway between its ends and the widest portion of the drive beams 18.1, 18.3 being off-centre, so that the transverse drive beams 18.1, 18.2, 18.3 are staggered relative to one another.

As can be clearly seen in FIGS. 1 to 5 of the drawings, each piston 34.1, 34.2, 34.3 has at least one longitudinally extending portion which is of a substantially reduced diameter compared to the inside diameter of the cylinder 26. Over these portions, internal reinforcing members 300.1, 300.2 and 300.3 are located. In fact, for the pistons 34.1 and 34.3 there are two internal reinforcing members 300.1 and 300.3 respectively, each being in the form of a half pipe. The piston 34.2 supports two internal reinforcing members 300.2, each in the form of a circular cylindrical sleeve which is fastened to the piston 34.2 by grub screws (not shown). The four reinforcing members 300.1 and 300.3 are arranged with longitudinally extending edges meeting at the top and bottom of the cylinder 26. In other words, the reinforcing members 300.1 are in effect a circular cylindrical sleeve split along its top and its bottom and the reinforcing members 300.3 are similarly a circular cylindrical sleeve split along its top and its bottom.

The reinforcing members 300.1 and 300.3 extend longitudinally from immediately behind a head portion of the pistons 34.1 and 34.3 respectively to where the force transfer members 50 are bolted to the pistons 34.1 and 34.3 and are thus caught between the head portions of the pistons and the force transfer members 50. The reinforcing members 300.2 extend longitudinally from ends of the piston 34.2 some distance towards where the force transfer members 50 are bolted to the piston 34.2. As can be clearly seen in FIGS. 1 to 5, the reinforcing members 300.1 and 300.3 are substantially thicker than the reinforcing members 300.2, due to the dimensions of the pistons 34.1 and 34.3 on the one hand, and the piston 34.2 on the other hand. Typically, the reinforcing members 300.1, 300.2 and 300.3 are of a synthetic plastics or polymeric material such as Vesconite (trade name) which is a low kinetic or dynamic friction material.

The reinforcing members 300.1, 300.2 and 300.3 are concentric with the cylinder 26, and in particular with the internal surface thereof and bridge the apertures or slots 30 when sliding past the slots 30. The reinforcing members 300.1 and 300.3, being in the form of half pipes, when seen in section transverse to the cylinder 26, thus have an arc length subtended by an angle of about 90° and have a chord which is almost equivalent to the internal diameter of the cylinder 26. In contrast, the apertures 30, when seen in section transverse to the cylinder 26, have an arc length subtended by an angle of 42° and the arc length is substantially shorter than the arc length of the reinforcing members 300.1 and 300.3. The reinforcing members 300.2, being circular cylindrical, also close their associated apertures or slots 30 when sliding past them.

The reinforcing members 300.1, 300.2, 300.3 fit with a slight clearance of about 0.25 mm inside the cylinder 26.

The reciprocating floor conveyor 10, as illustrated, forms part of a heavy load-bearing vehicle, with the floor surface 16 defining the load-bearing surface of the vehicle. However, as will be appreciated, the reciprocating floor conveyor 10 of the invention does not necessarily have to form part of a vehicle, but can be used also in other applications.

With reference to FIGS. 1 to 5, the operation of the linear hydraulic motor 10 and the beneficial action of the internal reinforcing members 300.1, 300.2 and 300.3 is now described. In FIG. 1, all three of the pistons 34.1, 34.2 and 34.3 are shown in positions where they are as far to the left inside the cylinder 26 as possible. In order to displace the transverse drive beam 18.1 in the direction of arrow 84 (see FIG. 1), and thus also to displace the slats of the group of slats 14.1 in the direction of the arrow 84, a hydraulic fluid, typically a hydraulic oil, is injected into the chamber 38.2, thus forcing the piston 34.1 to the right as far as it can go, as shown in FIG. 2. For clarity, the hydraulic fluid is not shown. At this time, the pistons 34.2 and 34.3 can not be displaced to the left. In order to displace the piston 34.2 to the right as shown by arrow 88 in FIG. 3, hydraulic fluid is then forced into the chamber 38.3. At this time, the piston 34.3 can not be displaced to the left. The piston 34.3 is then displaced to the right against the piston 34.2, in the direction of arrow 92 as shown in FIG. 4 by injecting hydraulic fluid into the chamber 38.4. In order to return all three of the pistons 34.1, 34.2, 34.3 to the starting position in which they are as far to the left as possible, as shown by arrows 96 in FIG. 5, hydraulic fluid is forced into the chamber 38.1, thus pushing all three pistons 34.1, 34.2, 34.3 simultaneously to the left. In this fashion, the movement sequence of the group of slats 14.1, 14.2, 14.3 is established. It is however to be appreciated that the sequence can also be reversed, with all the pistons starting at the right in FIG. 1.

In a load-bearing reciprocating floor conveyor, such as the reciprocating floor conveyor 10 illustrated in the drawings, maximum force is required when the transverse drive beams 18.1, 18.2, 18.3 are displaced individually e.g. to reach the positions shown in FIGS. 2, 3 and 4. The applicant has found that, under these maximum loading conditions, the split collars 58, sliding externally over the cylinder 26, tend to deform the cylinder 26 and to collapse the slots 30 in the sides of the cylinder 26. Movement of the transverse drive beam 18.1 in the direction of the arrow 84, as shown in FIG. 1, induces a tilting moment in a longitudinal direction with the result that the collar 58 exerts the forces as shown by the arrows 302, 304 in FIG. 1. Although it is possible to strengthen the cylinder 26 by increasing its wall thickness, this has the disadvantage that substantial weight is added to the linear hydraulic motor 12. The problem can also not be counteracted by increasing the lengths of the collars 58, as there is limited space available for the sliding collars 58. By means of the reinforcing members 300.1, 300.2, 300.3, this problem is addressed to an adequate extent.

As can be seen in FIG. 1, as a result of the bridging action of the right-hand, reinforcing member 300.2, the force 302 is at least partially transferred past the middle slot 30 to the bottom of the cylinder 26 thus reducing the compressive forces in portions of the wall of the cylinder 26 above and below the middle slot 30. Similarly, as the transverse drive beam 18.1 slides towards the right, the force 304 is transferred upwardly at least partially by means of the right-hand reinforcing member 300.2, with the right-hand reinforcing member 300.2 thus protecting the right-hand slot 30. The right-hand reinforcing member 300.2 thus provides support to the cylinder 26 from the inside out and transfer the forces 302, 304 through the piston 34.1 from the top of the cylinder 26 to the bottom of the cylinder 26.

When the transverse drive beam 18.2 is displaced to the right, the forces 306 and 308 are exerted on the cylinder 26 as shown in FIG. 2. In this case, the left-hand reinforcing member 300.2 of the piston 34.2 assists in transferring the force 306 to the bottom of the cylinder 26 and the right-hand reinforcing member 300.2 of the piston 34.2 assists in transferring the force 308 from the bottom of the cylinder 26 to the top of the cylinder 26, past the middle slot 30.

When the transverse drive beam 18.3 is displaced to the right, the forces 310, 312 shown in FIG. 3 act on the cylinder 26. The reinforcing member 300.3 then assists in transferring the force 310 through the piston 34.3 to the bottom of the cylinder 26 thereby protecting the left-hand slot 30 and the left-hand reinforcing member 300.2 assists in transferring the force 312 to the top of the cylinder 26, thereby protecting the middle slot 30.

As there is slight clearance between the reinforcing members 300.1, 300.2 and 300.3 on the one hand, and the cylinder 26 on the other hand, the reinforcing members effectively only strengthen the cylinder 26 when more than a predetermined vertical bending moment is applied to the cylinder 26. In this way, slide resistance is reduced when the reinforcing action of the reinforcing members is not required.

End portions of the cylinder 26 are slightly thickened in order further to protect the outermost slots 30. Importantly, the portions of increased thickness overlap to some extent with the outermost slots 30, as can be seen in FIGS. 1 to 5.

The invention claimed is:

1. A linear hydraulic motor which includes
   an elongate cylinder with at least one longitudinally extending aperture in a longitudinally extending wall of the cylinder,
   at least one piston slidingly located inside the cylinder, the piston having a longitudinally extending portion which fits with clearance in the cylinder and which describes a path in use which penetrates an interior zone of the cylinder which extends radially inwardly from the aperture in the cylinder wall;
   an internal reinforcing member slidingly located inside the cylinder to travel with the piston and located over at least a portion of said longitudinally extending portion of the piston, the reinforcing member describing a path in use which also penetrates said interior zone of the cylinder which extends radially inwardly from the aperture in the cylinder wall, the reinforcing member having portions which are concentric and radially aligned with circumferentially spaced portions of the cylinder wall that are on opposite sides of said aperture in the cylinder wall, and the reinforcing member at least partially closing the aperture in the cylinder wall when sliding past the aperture; and at least one force transfer member connected to the piston through said aperture in the cylinder wall.

2. The linear hydraulic motor as claimed in claim 1, in which the cylinder is circular cylindrical, the reinforcing member being at least part circular cylindrical with a chord which is at least equal to a chord of the aperture in the cylinder wall.

3. The linear hydraulic motor as claimed in claim 2, in which the reinforcing member, when seen in section transverse to the cylinder, has an arc length subtended by an angle of at least 45°.

4. The linear hydraulic motor as claimed in claim 3, in which the arc length of the reinforcing member is subtended by an angle of at least 60°.

5. The linear hydraulic motor as claimed in claim 1, in which the aperture, when seen in section transverse to the cylinder, has an arc length subtended by an angle of about 42° or less.

6. The linear hydraulic motor as claimed in claim 1, in which the reinforcing member is in the form of a circular cylindrical sleeve.

7. The linear hydraulic motor as claimed in claim 6, in which the sleeve is longitudinally split in at least one location.

8. The linear hydraulic motor as claimed in claim 1 inclusive, in which the reinforcing member is in the form of a half pipe.

9. The linear hydraulic motor as claimed in claim 1, which includes at least two longitudinally spaced pistons inside the cylinder, the pistons being arranged in series.

10. The linear hydraulic motor as claimed in claim 9, in which the pistons are movable independently from each other in at least one longitudinal direction inside the cylinder, and are movable in unison in a counter-direction, thereby providing the linear hydraulic motor with a stroke in which the pistons can be simultaneously displaced in one direction.

11. A reciprocating floor conveyor which includes a plurality of elongate floor members defining a floor surface and being grouped in at least two sets;

at least two transverse drive beams, each drive beam being fast with an associated set of the floor members; and drive means drivingly connected to the transverse drive beams, the drive means including at least one linear hydraulic motor as claimed in claim 1 drivingly connected to at least one of the transverse drive beams, said transverse drive beam being slidingly supported on the cylinder of the linear hydraulic motor.

12. The reciprocating floor conveyor as claimed in claim 11, in which the linear hydraulic motor includes two or three longitudinally spaced pistons, each piston in use transferring force transversely outwardly through the cylinder to an associated transverse drive beam.

* * * * *